United States Patent
Daskiewich et al.

(10) Patent No.: US 9,649,741 B2
(45) Date of Patent: May 16, 2017

(54) POLISHING MATERIAL FOR POLISHING HARD SURFACES, MEDIA INCLUDING THE MATERIAL, AND METHODS OF FORMING AND USING SAME

(71) Applicant: JH Rhodes Company, Inc., Tempe, AZ (US)

(72) Inventors: Scott Daskiewich, Oriskany, NY (US); Brent Muncy, Clark Mills, NY (US); George Wasilczyk, Allentown, PA (US)

(73) Assignee: JH RHODES COMPANY, INC., Tempe, AZ (US)

( * ) Notice: Subject to any disclaimer, the term of this patent is extended or adjusted under 35 U.S.C. 154(b) by 241 days.

(21) Appl. No.: 14/325,106

(22) Filed: Jul. 7, 2014

(65) Prior Publication Data

US 2016/0001417 A1 Jan. 7, 2016

(51) Int. Cl.
*B24B 37/34* (2012.01)
*B24D 3/34* (2006.01)
*C08G 18/72* (2006.01)
*B24B 37/24* (2012.01)
*B24D 3/32* (2006.01)
*B24D 11/00* (2006.01)

(52) U.S. Cl.
CPC .............. *B24B 37/24* (2013.01); *B24D 3/32* (2013.01); *B24D 3/34* (2013.01); *B24D 11/001* (2013.01); *B24D 11/003* (2013.01); *C08G 18/72* (2013.01)

(58) Field of Classification Search
CPC .. B24B 37/24; B24D 3/32; B24D 3/34; B24D 11/001; B24D 11/003; C08G 18/72
USPC ..................................... 451/41, 59
See application file for complete search history.

(56) References Cited

U.S. PATENT DOCUMENTS

| | | | | |
|---|---|---|---|---|
| 5,910,471 A * | 6/1999 | Christianson | ........... | B24B 13/01 451/529 |
| 6,634,929 B1 * | 10/2003 | Visser | ...................... | B24B 7/241 451/28 |
| 6,739,962 B2 | 5/2004 | Roberts et al. | | |
| 6,949,589 B2 | 9/2005 | Oyaizu | | |
| 8,435,098 B2 * | 5/2013 | You | ........................ | B24D 11/00 451/526 |
| 2002/0026752 A1 * | 3/2002 | Culler | ...................... | B24D 3/28 51/298 |
| 2002/0098782 A1 | 7/2002 | James et al. | | |
| 2003/0045213 A1 * | 3/2003 | Keipert | ................... | B24D 3/344 451/57 |
| 2003/0150169 A1 * | 8/2003 | Annen | .................. | B24D 11/008 51/300 |
| 2004/0054023 A1 | 3/2004 | Kaneda et al. | | |
| 2004/0224622 A1 * | 11/2004 | Sakurai | ................... | B24B 37/24 451/526 |
| 2005/0260942 A1 * | 11/2005 | Kawahara | ............... | B24B 37/26 451/527 |
| 2006/0280930 A1 | 12/2006 | Shimomura et al. | | |
| 2009/0053976 A1 | 2/2009 | Roy et al. | | |
| 2009/0191795 A1 * | 7/2009 | Kuwabara | ............. | B24B 37/042 451/41 |
| 2011/0130077 A1 * | 6/2011 | Litke | ....................... | B24B 37/24 451/41 |
| 2012/0083187 A1 * | 4/2012 | Okamoto | ................ | B24B 37/24 451/28 |
| 2013/0316621 A1 * | 11/2013 | Maekawa | ............... | B24B 37/24 451/59 |
| 2015/0217424 A1 * | 8/2015 | Qian | .................... | C09K 3/1436 451/59 |

FOREIGN PATENT DOCUMENTS

WO WO 2012141327 A1 * 10/2012 ................ C08J 9/12

OTHER PUBLICATIONS

WIPO; Written Opinion of the International Searching Authority mailed Sep. 30, 2015 in International Application No. PCT/US2015/037433.
WIPO; Notification of Transmittal of the International Search Report and the Written Opinion of the International Searching Authority mailed Sep. 30, 2015 in International Application No. PCT/US2015/037433.

* cited by examiner

*Primary Examiner* — Eileen Morgan
(74) *Attorney, Agent, or Firm* — Snell & Wilmer L.L.P.

(57) ABSTRACT

Polishing materials suitable for polishing hard surfaces, media including the polishing material, and methods of forming and using the polishing materials and media are disclosed. Exemplary polishing materials have a relatively high hard segments:soft segments ratio and exhibit relatively high removal rates and/or relatively high process yields.

14 Claims, No Drawings

POLISHING MATERIAL FOR POLISHING HARD SURFACES, MEDIA INCLUDING THE MATERIAL, AND METHODS OF FORMING AND USING SAME

FIELD OF INVENTION

The present disclosure generally relates to polishing material and media suitable for use in polishing a hard-surface material.

BACKGROUND OF THE DISCLOSURE

Polished hard surfaces are desirable for several applications. For example, polished hard surfaces can be used to form scratch/abrasion-resistant materials for electronic and other consumer products.

To polish a surface of a substrate, polishing media are placed adjacent to the substrate and moved relative to the substrate surface. This relative movement can be created by rotating the media, by rotating the substrate, by orbital movement of the substrate or media, or a combination of such movements, typically within an epicyclic gear system. Additionally or alternatively, linear or any other useful relative motion between the media and the substrate can be used. A force can be applied to press the media against the substrate surface. A slurry, which includes abrasive materials, can be used in the polishing process to assist with removing material from the substrate surface.

By their nature, hard materials are difficult to polish. Typical polishing media used to polish surfaces of hard materials, such as sapphire, include non-woven impregnated polyester felts. Although these materials can be used to polish sapphire and/or other hard materials, material removal rates during polishing and material removal uniformity is often less than desired. In addition, product yields through polishing can be relatively low (e.g., about sixty to seventy percent or less). Because the material removal rates are relatively low, additional polishing time, labor, and equipment is required to polish the hard material surfaces. The additional time, labor, and equipment, in turn, leads to increased costs associated with polishing the hard material surfaces.

Accordingly, improved polishing materials and media with improved performance (e.g., relatively high and uniform removal rates and/or relatively high yields) and methods of forming and using the media and materials are desired.

SUMMARY OF THE DISCLOSURE

Various embodiments of the present disclosure relate to improved methods and materials suitable for polishing a surface of a hard material. While the ways in which various embodiments of the present disclosure address drawbacks of prior polishing materials and methods are discussed in more detail below, in general, various embodiments of the disclosure provide a polyurea-based and/or polyurethane-based material that enables relatively high polishing removal rates, relatively uniform material removal from the substrate surface, and/or relatively high yields, and methods that include the using and forming such materials.

In accordance with exemplary embodiments of the disclosure, a hard-surface polishing material includes hard segments and soft segments. The hard segments can be formed by, for example, reacting one or more aromatic or aliphatic polyisocyanates, polyisocyanate derivatives, and polyisocyanate products with one or more first compounds, such as one or more aromatic active hydrogen compounds or oligomeric active hydrogen compounds (e.g., oligomeric active hydrogen compounds having a molecular weight of 60 Da to 150 Da). The soft segments can be formed by, for example, reacting one or more aromatic or aliphatic polyisocyanates, polyisocyanate derivatives, and polyisocyanate products with one or more second compounds, such as one or more oligomeric active hydrogen compounds with a molecular weight of 150 da to 6000 Da. In accordance with exemplary aspects of these embodiments, a ratio of the hard segments to soft segments in the hard-surface polishing material is greater than or equal to 0.95:1, 1:1, 1.05:1, or 1.1:1. As set forth in more detail below, the inventors surprisingly and unexpectedly found that the relatively high ratio of greater than or equal to 0.95:1, 1:1, 1.05:1, or 1.1:1 of the hard segments to soft segments in the hard-surface polishing material not only provides suitable hard material removal rates, but provides superior removal rates, uniformity of material removal, and/or higher process yields, compared to traditional polishing media used for similar applications. The hard-surface polishing material can be a foam, such as a polyurethane foam, a polyurea foam, or a hybrid polyurethane-polyurea foam. The hard-surface polishing material foam can be formed using a foaming/blowing agent. The hard-surface polishing material can also include from 0 wt % to about 80 wt % organic and/or inorganic filler. In accordance with further examples, a bulk density of the hard-surface polishing material is between about 0.2 g/cm$^3$ and 1.2 g/cm$^3$. A Shore D hardness of the hard-surface polishing material can be between about 10 and 80. The hard-surface polishing material can include grooves on a surface to facilitate polishing. Additionally or alternatively, the hard-surface polishing material can include adhesive on a surface to facilitate attachment of the hard-surface polishing material to a polishing machine. The hard-surface polishing material can be formed into a polishing pad, which can be singular or part of a stacked pad.

In accordance with further exemplary embodiments of the disclosure, a method of polishing a hard surface (e.g., a surface having hardness greater than the hardness of glass, or about 1550 HB Brinell scale or 7 Moh's scale) includes use of a polishing material as described herein. For example, exemplary methods include providing a polishing material including hard segments and soft segments, wherein the hard segments can be formed by, for example, reacting one or more aromatic or aliphatic polyisocyanates, polyisocyanate derivatives, and polyisocyanate products with one or more first compounds, such as one or more aromatic active hydrogen compounds or oligomeric active hydrogen compounds (e.g., oligomeric active hydrogen compounds having a molecular weight of 60 Da to 150 Da), and the soft segments can be formed by, for example, reacting one or more aromatic or aliphatic polyisocyanates, polyisocyanate derivatives, and polyisocyanate products with one or more second compounds, such as one or more oligomeric active hydrogen compounds with a molecular weight of 150 Da to 6000 Da. Exemplary methods further include moving the polishing material relative to the hard surface to remove material from the surface of the hard material (e.g., using an epicyclic gear system or other suitable system). The polishing can be done in the presence of a slurry that includes abrasive particles and/or in the presence of a cooling liquid. As noted above, the inventors found surprising and unexpected removal rates and yields (measured as percent of substrates passing visual inspection following polishing and not requiring rework; surface defects are typically less than 40 microns long, 13 microns wide and 3 microns deep) using the methods disclosed herein—compared to traditional techniques for polishing hard surfaces. By way of examples, removal rates of greater than or equal to 2 microns per hour, greater than or equal to 2.1 microns per hour, and between about 2.1 microns per hour to about 2.5 microns of hard surface material, such as sapphire were obtained, as compared to removal rates of 0.8-1.0 microns per hour obtained with traditional materials under similar process conditions, with yields of greater than about 75%, greater than about 80%, or about 90% to about 100% as compared to typical yields of 60-70% obtained with traditional polishing materials.

In accordance with yet further exemplary embodiments of the disclosure, a method of forming a hard-surface polishing material includes the steps of mixing one or more first compounds and second compounds as described herein, reacting one or more of polyisocyanates, polyisocyanate derivatives, and polyisocyanate products with the one or more first compounds to form hard segments and reacting one or more of polyisocyanates, polyisocyanate derivatives, and polyisocyanate products with one or more second compounds to form soft segments, wherein a ratio of the hard segments to the soft segments is greater than or equal to 0.95:1, 1:1, 1.05:1, or 1.1:1, and pouring a composition including the hard segments and the soft segments into a mold. In accordance with various aspects of these embodiments, a method further includes a step of providing a foaming or blowing agent and mixing the foaming/blowing agent with the one or more first compounds and/or second compounds. The method can also include the steps of providing one or more surfactants and mixing the one or more surfactants with the one or more first compounds and second compounds. The method can also include the steps of providing filler material and mixing the filler material with the one or more first compounds and second compounds. The method can also include a step of curing the composition—e.g., at a temperature of about 100° C. to about 130° C. for about 6 hours to about 12 hours. Exemplary methods can also include a step forming grooves into a surface of the polishing material, skiving the polishing material, and/or adding adhesive to a surface of the polishing material.

In accordance with yet additional exemplary embodiments of the disclosure, a polishing media (e.g., a polishing pad) pad comprises a hard-surface polishing material as described herein. The polishing media can include grooves on a surface. Additionally or alternatively the polishing media can include adhesive material on a surface.

In accordance with yet further exemplary embodiments of the disclosure, a method of forming a polishing media includes a method of forming a hard-surface polishing material as described herein. The method can additionally include steps of skiving the base material, forming grooves in the material, and/or adding adhesive material to a surface of the material.

DETAILED DESCRIPTION OF EXEMPLARY EMBODIMENTS OF THE DISCLOSURE

The description of exemplary embodiments of hard-surface polishing materials and methods of forming and using the materials provided below is merely exemplary and is intended for purposes of illustration only; the following description is not intended to limit the scope of the disclosure or the claims. Moreover, recitation of multiple embodiments having stated features, compositions, or properties is not intended to exclude other embodiments having additional features, compositions, or properties, or other embodiments incorporating different combinations of the stated features, compositions, or properties.

Polished hard surfaces, such as polished sapphire, can be used in a variety of applications, including transparent watch crystals and protective surfaces on smart phones and other devices. These materials are often polished to remove scratches that may otherwise be present from prior processing steps, such as cutting, grinding or lapping of the material. Because the materials are hard, they are difficult to polish at desired removal rates, without imparting additional scratches on the hard-material surface.

Exemplary materials and media (e.g., polishing pads) described herein can be used for a variety of applications, including polishing a hard surface of a substrate. By way of examples, the materials and media can be used to polish hard-surface materials, such as sapphire (e.g., the A, C, or R planes of sapphire), other gem stones, such as emeralds and rubies, ceramics, metals, such as titanium, and similar materials. The polished hard-surface materials are suitable for use as electronic device displays, electronic device cases, electronic back plates, watch crystals, and a variety of other applications. Exemplary polishing media described herein exhibit relatively high removal rates, uniformities of material removal, and/or high process yields, compared to traditional media used for such applications. As used herein, the term "hard surface" or "hard-surface material" means a material having a hardness greater that the hardness of glass (e.g., greater than about 1550 HB Brinell scale or about 7 Moh's scale).

In accordance with exemplary embodiments of the disclosure, a hard-surface polishing material includes hard segments, soft segments, and from 0 wt % to about 80 wt % filler material, wherein a weight ratio of the hard segments to the soft segments is greater than or equal to 0.95:1, 1:1, 1.05:1, or 1.1:1. The hard segments within the hard-surface polishing pad are generally of shorter chain length and aggregate into crystalline domains compared to the soft segments, which have a longer chain length and are more rubbery in nature. The hard segments can include hydrogen bonds between similar structures, wherein the structures aggregate into crystalline domains. Polishing materials with a weight ratio of the hard segments to the soft segments of greater than or equal to 0.95:1, 1:1, 1.05:1, or 1.1:1 provide relatively high removal rates, relatively high uniformity of removal of material from a hard surface, and/or relatively high yields (e.g., greater than about 75%, greater than or equal to about 80%, or about 90% to 100%), where yield is defined by a number of substrates that pass a visual inspection (without optical magnification—e.g., in the size range noted above), without having to be return the substrate for further polishing, divided by a total number of substrates processed. As set forth in more detail below, the hard-surface polishing material can be in the form of a foam and can include polyurea, polyurethane, and/or a hybrid polyurethane-polyurea.

In accordance with various aspects of these embodiments, the hard segments are formed by, for example, reacting one or more aromatic or aliphatic polyisocyanates, polyisocyanate derivatives, and polyisocyanate products with one or more first compounds, such as one or more aromatic active hydrogen compounds or oligomeric active hydrogen compounds (e.g., oligomeric active hydrogen compounds having a molecular weight of 60 Da to 150 Da). By way of examples, the hard segments can be formed by reacting one or more of either single aromatic ring polyisocyanates, polyisocyanate derivatives, and polyisocyanate products with one or more first compounds that are aromatic. An exemplary class of compounds suitable for use as the first compounds is known as crosslinkers. Exemplary crosslinkers include compounds that have three or more active hydrogen, such as Quadrol®, glycerol, trimethylolpropane, triethanolamine, pentaerythritol, and diethylenetriamine. Also by way of example the hard segments can be formed by reacting one or more of double (or greater number) aromatic ring polyisocyanates, polyisocyanate derivatives, and polyisocyanate products with one or more first compounds that are aliphatic compounds typically of low molecular weight and linear in structure. An exemplary class of compounds suitable for use as the first compounds is known chain extenders, discussed in more detail below.

The soft segments can be formed by, for example, reacting one or more aromatic or aliphatic polyisocyanates, polyisocyanate derivatives, and polyisocyanate products with one or more second compounds, such as one or more oligomeric active hydrogen compounds with a molecular weight of 150 Da to 6000 Da. By way of examples, the soft segments can be formed by reacting one or more of polyisocyanates, polyisocyanate derivatives, and polyisocyanate products with one or more of a chain extender and/or a polyol (which can be —OH, —NH, and/or —NH$_2$ terminated).

The polyisocyanates, polyisocyanate derivatives, and polyisocyanate products can be reacted with one or more first compounds and second compounds with one or more —OH terminated ends to form a polyurethane material, one or more —NH$_2$ or NH terminated ends to form polyurea, and/or an —OH terminated end and/or an —NH$_2$ or —NH terminated end to form a polyurethane-polyurea hybrid material. In the case of the hybrid material, an exemplary combination of a first compound and a second compound has at least one —OH terminated end and one —NH$_2$ or —NH terminated end.

Exemplary polyisocyanates or derivatives or products thereof that can be used to prepare the hard and/or soft segments include, but are not limited to, one or more aliphatic polyisocyanates; ethylenically unsaturated polyisocyanates; alicyclic polyisocyanates; aromatic polyisocyanates wherein the isocyanate groups are not bonded directly to the aromatic ring, e.g., xylene diisocyanate; aromatic polyisocyanates wherein the isocyanate groups are bonded directly to the aromatic ring, e.g., benzene diisocyanate; halogenated, alkylated, alkoxylated, nitrated, carbodiimide modified, urea modified and biuret modified derivatives of polyisocyanates belonging to these classes; and dimerized and trimerized products of polyisocyanates belonging to these classes. Exemplary molecular weight ranges for the one or more of polyisocyanates, polyisocyanate derivatives, and polyisocyanate products range from about 150 Da to about 1000 Da. By way of example, a polyisocyanate functional polyurethane prepolymer is prepared from a diisocyanate, e.g., toluene diisocyanate, and a polyalkylene glycol, e.g., poly(tetrahydrofuran) with an molecular weight of about 250 to about 6000 Da.

Classes of first compounds and/or chain extenders that can be used to prepare the exemplary hard-surface polishing materials include, but are not limited to: straight or branched chain alkane polyols, e.g., ethanediol, propanediol, butanediol, 1,4 butanediol, glycerol, neopentyl glycol, trimethylolethane, ethylene glycol, diethylene glycol, and trimethylolpropane. Additional classes of polyols that can be used to prepare exemplary isocyanate functional polyurethane derivatives include, for example, higher polyalkylene glycols, such as polyethylene glycols having number average molecular weights of, for example, from 200 to 500 Da and hydroxy functional polyesters, such as those formed from the reaction of diols, such as butane diol, and diacids or diesters, e.g., adipic acid or diethyl adipate, and having an molecular weight of, for example, from 200 to 500 Da. Particular chain extenders include 4,4'-methylene-bis-o-chloroaniline (MBCA or MOCA). Exemplary molecular weight ranges for the chain extenders range from about 50 Da to about 500 Da.

In the cases of polyurea and polyurethane-polyurea hybrid materials, one or more of the first compound(s) and the second compound(s) can include an amine. Exemplary amines include primary amines, such as one or more of polyether diamines, polycarbonate diamines, polyester diamines, polycaprolactone diamines, secondary amines, such as one or more of: polyether diamines, polycarbonate diamines, polyester diamines and polycaprolactone diamines, and aromatic amines, such as Ethacure 420 from Albermarle Corporation. Various exemplary secondary polyamines suitable for use to form the polyurea-based material include a general formula: R[—NH—R']n, wherein n is greater than or equal to 2, and wherein R is not H and R' is not H. By way of examples, the secondary polyamines can include the formula above, where R is a polyoxypropylene polyether, R' is an isobutyl group and n is 2. Exemplary molecular weights of the amines range from about 250 Da to about 5000 Da. One particular exemplary secondary diamine is available from Hunstman under the name SD-2001 polyether.

Exemplary polyols include straight or branched chain alkane polyols, e.g., ethanediol, propanediol, propanediol, butanediol, 1,4 butanediol, glycerol, neopentyl glycol, trimethylolethane, ethylene glycol, diethylene glycol, and trimethylolpropane. Exemplary molecular weight ranges for the polyols range from about 250 Da to about 5000 Da. Additional classes of polyols that can be used to prepare exemplary isocyanate functional polyurethane derivatives include, for example, higher polyalkylene glycols, such as polyethylene glycols having number average molecular weights of, for example, from 200 to 2000 Da and hydroxy functional polyesters, such as those formed from the reaction of diols, such as butane diol, and diacids or diesters, e.g., adipic acid or diethyl adipate, and having an molecular weight of, for example, from 200 to 2000 Da. By way of example, a polyisocyanate functional polyurethane derivative is prepared from a diisocyanate, e.g., toluene diisocyanate, and a polyalkylene glycol, e.g., poly(tetrahydrofuran) with an molecular weight of about 1000 Da.

Exemplary fillers include organic and/or inorganic fillers. Exemplary inorganic fillers can include exemplary abrading particles that include, but are not limited to, particles of, for example, cerium oxides, silicon oxides, aluminum oxides, zirconia, iron oxides, manganese dioxides, kaolin clays, montmorillonite clays, titanium oxides, silicon carbides and diamond. A size of the inorganic particles can range from about 0.001 microns to about 1000 microns, or about 0.5 microns to about 3.0 microns average diameter. Exemplary organic fillers include polyurethane foam, epoxy, polystyrene, polyacrylic, polyimide, or other thermoplastic or thermoset materials. The polishing material can include 0 to about 80 weight percent filler. Exemplary filler loading ranges from about 15 wt % to about 30 wt % or about 20 wt % to about 25 wt %.

A foaming agent (also referred to herein as a blowing agent) can be used to facilitate making the polyurea, polyurethane, and/or polyurethane-polyurea material into a foam. Exemplary foaming agents include one or more of a hydroflourocarbon (HFC) or azeotrope of 2 or more hydrocarbon (HFCs), such as 1,1,1,3,3-pentaflourobutane (HFC-365); 1,1,1,2-tetraflouroethane (HFC-134a), methoxy-nonafluorobutane (HFE-7100) and a free radical initiator comprising an azonitrile, such as 2,4-Dimethyl, 2,2'-Azobis Pentanenitrile. Particular foaming agents include the HFCs Solkane® 365mfc and 134a (Solvay, Hannover, Germany), and free radical initiators Vazo 52 (Dupont, Wilmington, Del.). Water is also commonly used to foam polyurethane/polyurea systems via the reaction between water and isocyanate producing carbon dioxide. Various combinations of foaming agents, including, but not limited to those disclosed herein, can be used to form material or media including the material and are contemplated in this disclosure.

Exemplary hard-surface polishing materials can also include cell stabilizers, also referred to herein as surfactants. Exemplary cell stabilizers/surfactants include Momentive brand L-6100 and Dow Corning DC-193. Typical examples include polydimethylsiloxane silicone fluids that are provided at different molecular weights as indicated by viscosity (which can range from 0.65 to 60,000 centistokes) with exemplary materials being low viscosity fluids or siloxanepoly ether copolymers. The siloxane portion can be either hydrolyzable or non hydrolyzable. Some examples are non hydrolyzable. The polyether portion of the copolymer typically is either a random or block copolymer of ethylene oxide and propylene oxide of varying relative ratios and overall molecular weights.

The hard-surface polishing materials can also include cell openers to, for example, promote cell opening during the interaction of two cells in the liquid phase. Exemplary cell openers include, but are not limited to, non-hydrolyzable polydimethylsiloxanes, polyalkyleoxides, dimethylsiloxy, methylpolyethersiloxy, silicone copolymers, such as Dabco DC-3043 or Dabco DC-3042, available from Air Products, Allentown, Pa.

When in a configuration of foam matrix, the hard-surface polishing material can have a bulk density of about 0.2 to about 1.2 g/cm$^3$, or about 0.35 to about 0.65 g/cm$^3$, and/or a hardness of about 10 to about 80 Shore D, or about 30 Shore D to about 60 Shore D.

Exemplary polishing materials can also include a colorant, such as iron oxide, carbon black, phthalocyanide green or other pigments known to those skilled in the art.

Polishing Media

Polishing media can include a foam material that includes a hard-surface polishing material as described herein. The polishing media can include grooves on a surface. Additionally or alternatively the polishing media can include adhesive material on a surface.

Methods of Forming Hard-Surface Polishing Material and Media

Exemplary methods of forming a hard-surface polishing material include the steps of mixing one or more first compounds and/or one or more second compounds; reacting one or more of polyisocyanates, polyisocyanate derivatives, and polyisocyanate products with the one or more first compounds to form hard segments and reacting one or more of polyisocyanates, polyisocyanate derivatives, and polyisocyanate products with one or more second compounds to form soft segments, wherein a ratio of the hard segments to the soft segments is greater than or equal to 0.95:1, 1:1, 1.05:1, or 1.1:1; and pouring a composition including the hard segments and the soft segments into a mold. Exemplary methods can include adding and mixing additional materials as described herein or as otherwise known in the art. Various polishing materials as described herein can be prepared in the presence of a catalyst. Others can be formed without a catalyst. Classes of suitable catalysts include, but are not limited to, tertiary amines, such as triethylamine, trimethylamine, triethylene diamine, tetramethylene diamine, dimethyl piperazine, dimethylcycyclohexyl amine, bis(dimethylaminopropylether), and organometallic salts of tin, cobalt, bismuth and cadmium with octoates, dilaurates, diacetates, dioctoates, oleates and neodeconates of these metals. By way of particular example, the step of mixing comprises providing a prepolymer having isocyanate (N=C=O) groups with a weight percent of available N=C=O groups available for reaction with one or more first compounds (A), wherein a stoichiometric weight percent (B) of one or more first compounds is available to react with the prepolymer, and wherein 0.284A+0.009B is greater than or equal to 1.3 or greater than or equal to 1.5.

The materials or components can be mixed together using, for example, high-shear blending to incorporate air and/or particles (e.g., fillers) into a matrix. The hard-surface polishing material can be formed as a foam or matrix in an open mold.

Methods of forming hard-surface polishing material suitable for polishing media can include mixing the ingredients or components in a single mixer. In accordance with various exemplary methods, one or more first compounds and/or second compounds (e.g., a primary or secondary polyamine or derivative or product thereof or other suitable polyol and/or amine) is mixed, for example, in an open-air container with the use of a high-shear impeller. During the mixing process, atmospheric air can be entrained in the mix by the action of the impeller, which pulls air into a vortex created by the rotation. The entrained gas bubbles can act as nucleation sites for a foaming process. A blowing/foaming agent, such as water, can be added to the mix to facilitate a reaction, which produces a gas, such as $CO_2$, resulting in cell growth. Alternately, microballoons can be used to form the voids. During this open-air mix and while in the liquid phase, other optional additives can be added to the mix such as surfactants or additional blowing/foaming agents. Furthermore, the mixture may be reacted with a chain extender or other first compound(s), such as, 4,4'-methylene-bis-o-chloroaniline (MBCA or MOCA). The chain extender may initiate polymerization and chain extension, causing the viscosity of the mix to increase rapidly after the polyisocyanate is added.

In addition to or in lieu of chemical foaming agents and cell openers, it may be possible to directly introduce gas bubbles into the mix during the mix process. For example, while the mix is still in the liquid state, such as before the addition of polyisocyanates, or after the addition of polyisocyanates but within a low-viscosity window, or at any other suitable time, an output of a gas injector can be inserted directly into the open-air mix, causing injection of more bubbles than would otherwise be introduced through the action of the impeller alone. Optionally, one may apply micro-filtration to the output end of a pump, such as a gas injector pump, to promote the formation of very small bubbles, such as those in the 1-10 micron diameter range. A step of directly introducing gas bubbles can allow the selection of the size and quantity of bubbles.

In some example embodiments, there is a short time window after the addition of a polyisocyanate or derivative or product thereof of about 1-2 minutes during which the viscosity of the mix remains low, called the "low-viscosity window." The mix may be poured into a mold during this window. In one example embodiment, quickly after the pour, the window passes, and existing pores become effectively frozen in place. Although pore motion can essentially have ended, pore growth may continue, for example, as $CO_2$ continues to be produced from a polymerization reaction. In one example embodiment, the molds are oven cured, for example, for about 6 to about 12 hours at about 100° C. to about 130° C. or about 115° C. to substantially complete the polymerization reaction.

After oven curing, the molds can be removed from the oven, and allowed to cool. At this point, the material can be skived to produce slices of the polishing material that can be made into circular pads or rectangular-shaped pads or pads of any other suitable shape. For example, the slices can be made by cutting to shape with a punch or cutting tool or any other suitable instrument. Additionally or alternatively, the polishing material can be buffed to form the polishing media. In some example embodiments, an adhesive is applied to one side of the pad. Additionally or alternatively, the polishing material surface can be grooved, if desired, for example, on the polishing surface in a pattern such as a cross-hatched pattern (or any other suitable pattern). By way of additional examples, a geometry or shape of grooves may comprise at least one of a square trough, a rounded trough, and a triangular trough. In addition to the specific embodiments disclosed, numerous physical configurations of various geometries to the polishing pad surface are contemplated in this disclosure. The grooves can be created via any mechanical method capable of producing grooves in a polishing material as described herein. For example, grooves can be created with a circular saw blade, a punch, a needle, a drill, a laser, an air-jet, a water jet, or any other instrument capable of rendering grooves in the pad. Moreover, grooves can be made simultaneously with a multiple gang-saw jig, a multiple-drill bit jig, a multiple punch jig, a multiple-needle jig, or the like.

The hard-surface polishing material can be used as a single pad or as a plurality of pads stacked on each other. For example, a stacked pad may comprise one or more pads as disclosed herein as well as a typical pad (e.g., polyurethane, polyurethane-polyurea hybrid, or polyurea formed with a lower hard segments:soft segments ratio) or a plurality of pads as described herein without a typical polishing pad.

Methods of Use

Hard-surface polishing material as described herein can be used to polish a variety of surfaces. For example, the hard-surface polishing material can be used to polish hard surfaces or hard materials, such as sapphire (e.g., the A, C, or R planes of sapphire), other gem stones, such as emeralds and rubies, ceramics, metals, such as titanium, and similar materials.

By way of examples, the polishing material as described herein can be used as a polishing pad on a polishing apparatus having a top plate, a bottom plate, and a sun gear. In this case, a bottom plate rotation speed can be from about (+) 25 rpm to about (+) 60 rpm, a top plate rotation speed can be from about (−) 8 rpm to about (−) 40 rpm, a sun gear speed can be about (+/−) 7 rpm to about 20 rpm, and a ring gear speed can be about (+/−) 7 rpm to about 20 rpm. With these settings in combination with a slurry (e.g., a colloidal silica slurry, such as Compol 80 from Fujimi) sapphire removal rates of greater than 2 microns/hour, greater than 2.1 microns per hour, or between about 2.1 microns per hour and about 2.5 microns per hour were achieved.

Surprisingly, the inventors found that removal rates and/or yields using the polishing materials as described herein were relatively independent of an amount of filler or abrasive material in the polishing material. However, the ratio of hard segments:soft segments was important to achieve desired removal rates and/or yields. It is thought that high modulus materials (typically greater than a storage modulus of about 150 MPa) that result from the high, e.g., greater than or equal to 0.95:1 hard segments:soft segments ratio, are able to keep slurry abrasive particles from becoming fully embedded in the solid (e.g., polyurethane) matrix (foam) and therefore in a position to do work on the workpiece. High modulus is achieved in this case by increasing the hard segments in the matrix via the manipulation of isocyanate and first compound levels. When storage modulus is paired with Shore D hardness of the material in multiple regression data modelling, better removal rate characteristic can be estimated. A Shore D indentor has a sharp tip that often shears when it penetrates a sample during testing. Therefore it can be thought of as an approximation of shear strength of the material and its resistance to puncture. Pads with high stock removal performance are relatively stiff (typically have a storage modulus of greater than 150 MPa) with respect to storage modulus but they are also very susceptible to puncture. Slurry abrasive particles are thought to puncture the solid urethane portion of the pad and become lodged where they can do work on the workpiece. Due to the highly rigid nature of the e.g., polyurethane matrix, the slurry abrasive particles cannot penetrate entirely into the material where they would be rendered ineffective. This may explain why softer pads are relatively ineffective at polishing sapphire—because the slurry particles can push into the softer urethane material and become enveloped in it which will make them unavailable for work on the workpiece. Thus, it is thought that the pad should be stiff enough to translate pressure from a polishing plate to a substrate, not so soft as to allow the pad to be pierced all the way through with abrasive particles, such as the abrasive particles in the slurry, but soft enough to allow the abrasive particles to be held in place by the pad.

Using a polishing material with a hard segments:soft segments ratio of greater than or equal to 0.95:1, 1:1, 1.05:1, or 1.1:1 provides relatively high removal rates and/or relatively high yield in an inexpensive manner. With the higher hard segments:soft segments ratio, less filler/abrasive material, which is relatively expensive, may be required, thus further reducing costs associated with polishing of hard surfaces. Furthermore, the increase yield and throughput reduces a number of polishing machines and reduces polishing time, also reducing costs associated with polishing a hard-surface material.

In accordance with various examples of the disclosure, a ratio of hard segments:soft segments can be measured or calculated by considering hard segments to be the molecular weight of the aromatic portion plus the 60 to 150 Da oligomeric portion minus the molecular weight of the diol and/or amine and isocyanate (N═C═O) portion of the polymer structure, while the soft segment can considered to be the 150 to 6000 Da portion of the polymer structure. The diol/amine/isocyanate portion of the structure is considered to be neither hard or soft segment but usually an intermediate phase and is excluded from the calculation. The hard segment:soft segment ratio is then normalized such that the soft segment equals 1. Another technique to obtain the hard segment:soft segment ratio includes: hard segments are considered to be the molecular weight of the aromatic portion plus the 60 to 150 Da oligomeric portion of the polymer structure, while the soft segment is considered to be the 150 to 6000 Da portion of the polymer structure. The hard segment:soft segment ratio is then normalized such that the soft segment equals 1.

Although exemplary embodiments of the present disclosure are set forth herein, it should be appreciated that the disclosure is not so limited. For example, although materials and media are described with particular fillers, foaming agents, and the like, the disclosure is not necessarily limited to these examples. Furthermore, although first compounds and second compounds are separately referred to, in some cases, the first compound(s) and the second compound(s) can be the same compound(s). Various modifications, variations, and enhancements of the materials, methods, and media set forth herein may be made without departing from the spirit and scope of the present disclosure.

What is claimed is:

1. A hard-surface polishing material comprising:
   hard segments;
   soft segments;
   from 0 wt % to about 80 wt % filler material, and
   one or more of a foaming agent and a cell stabilizer,
   wherein a weight ratio of the hard segments to the soft segments is greater than or equal to 0.95:1, and
   wherein the weight ratio of the hard segment to the soft segments is calculated by defining the hard segments to be the molecular weight of an aromatic portion of a polymer structure plus the 60 to 150 Da of an oligomeric portion of the polymer structure minus the molecular weight of a diol and/or an amine and an isocyanate (N=C=O) portion of the polymer structure, and the soft segment is defined as a 150 to 6000 Da portion of the polymer structure.

2. The hard-surface polishing material of claim 1, wherein the hard segments are formed by reacting one or more aromatic or aliphatic polyisocyanates, polyisocyanate derivatives, and polyisocyanate products with one or more aromatic active hydrogen compounds.

3. The hard-surface polishing material of claim 1, wherein the hard segments are formed by reacting one or more aromatic or aliphatic polyisocyanates, polyisocyanate derivatives, and polyisocyanate products with one or more oligomeric active hydrogen compounds with a molecular weight of 60 Da to 150 Da.

4. The hard-surface polishing material of claim 1, wherein the soft segments are formed by reacting one or more aromatic or aliphatic polyisocyanates, polyisocyanate derivatives, and polyisocyanate products with one or more oligomeric active hydrogen compounds with a molecular weight of 150 Da to 6000 Da.

5. The hard-surface polishing material of claim 1, wherein the hard-surface polishing material exhibits a polishing removal rate of sapphire at a rate of greater than or equal to 2 microns per hour.

6. The hard-surface polishing material of claim 1, wherein the hard-surface polishing material comprises a polyurethane foam.

7. The hard-surface polishing material of claim 1, wherein the hard-surface polishing material comprises a polyurea foam.

8. The hard-surface polishing material of claim 1, wherein the hard-surface polishing material comprises a hybrid polyurethane-polyurea foam.

9. The hard-surface polishing material of claim 1, wherein a hardness of the hard-surface polishing material ranges from about 10 Shore D to about 80 Shore D.

10. The hard-surface polishing material of claim 1, wherein a bulk density of the hard-surface polishing material ranges from about 0.2 g/cm$^3$ to about 1.2 g/cm$^3$.

11. A method of polishing a hard-surface material, the method comprising the steps of:
    using the hard-surface polishing material of claim 1 to remove material from a surface comprising one or more of sapphire, ruby, emerald, ceramics, titanium.

12. The method of claim 11, wherein the yield is greater than or equal to 80 percent.

13. The method of claim 11, wherein the surface comprises sapphire, and a material removal rate of material from the surface is greater than or equal to 2 microns per hour.

14. The method of claim 11, wherein the method comprises providing a surface finish suitable for electronic display applications.

* * * * *